Patented May 3, 1949

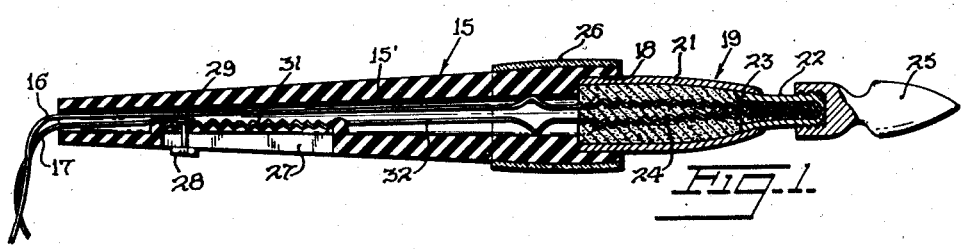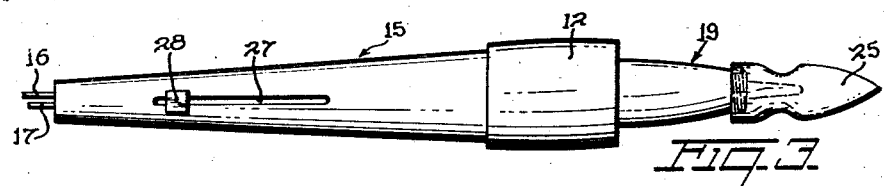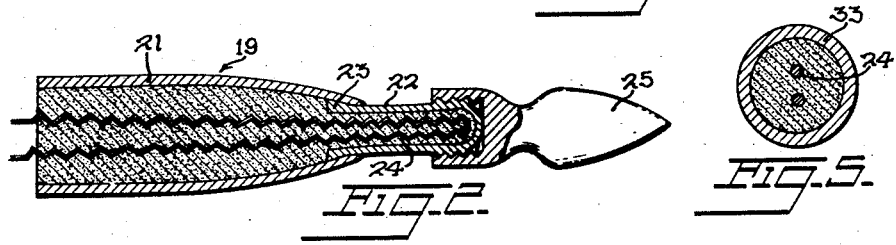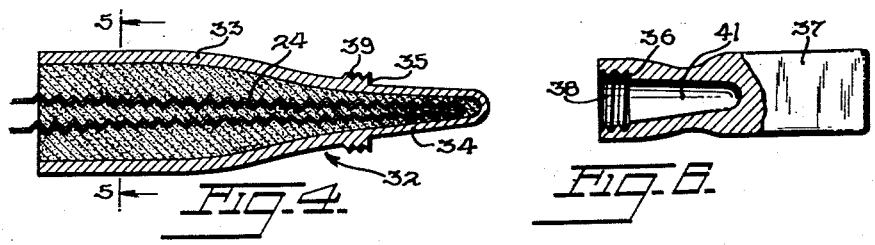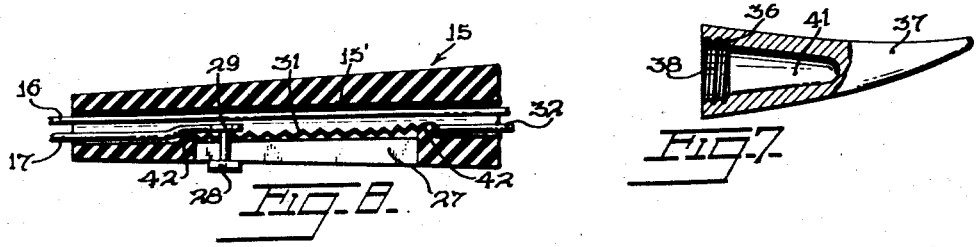

2,468,818

UNITED STATES PATENT OFFICE 2,468,818

ELECTRICALLY HEATED DENTAL SPATULA

Leonard Fox, Buffalo, and Raymond Resnick, New York, N. Y.

Application January 15, 1947, Serial No. 722,228

1 Claim. (Cl. 219—21)

This invention relates to a dental spatula and more particularly to a spatula which is provided with an electrical heating arrangement so that heat may be supplied while handling molten wax with the spatula.

It is an object of the present invention to provide a spatula for use in handling molten wax in which the tip is removable and is electrically heated wherein the tip or spatula head can be replaced from the heating element and another head placed thereon to be similarly heated by the heating element.

It is another object of the present invention to provide a holder arrangement for the spatula head on a wood handle portion which is of rugged construction and sufficiently insulated as to permit the handling of the spatula and wherein the heating element can be easily removed from the handle portion to be replaced should it be necessary to add a new heating element when the heating element being used burns out.

It is another object of the present invention to provide an electrically heated spatula with a control device enclosed within the handle portion of the spatula and easily accessible for regulating the heat given off by the heating element.

According to the invention, a heating structure is formed so that it can be tightly fitted into the end of a handle portion which is preferably made of wood or other heat insulating material and wherein there is formed on the opposite end of the heating element a tip adapted to receive a spatula head. This tip preferably has screw threads and the spatula head has internal threads adapted to fit over the threads of the heating element. The heating element includes heating coils or wires extending throughout the length of the same and into the tip of the same.

The tip construction according to one form of the invention is a piece separable from the main body of the heating element.

According to another form of the invention, the tip is made integral with the main body of the heating element casing. The heating wires are enclosed in asbestos within the casing. On the handle portion is a heat control device including a resistant wire and a slide adapted to be drawn along the same.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 1 is a longitudinal cross sectional view of the dental spatula constructed in accordance with the present invention.

Fig. 2 is an enlarged detailed view of a portion of Fig. 1.

Fig. 3 is a plan view looking upon an assembled spatula but having a head construction upon the heating element of different form.

Fig. 4 is a longitudinal cross sectional view of the heating element utilized in the arrangement shown in Fig. 3.

Fig. 5 is a transverse cross sectional view taken on line 5—5 of Fig. 4 looking in the direction of the arrows thereof.

Fig. 6 is a fragmentary view of a spatula having a different shaped head than that shown in Figs. 1 and 2 and having its neck construction adapted to fit the heating element shown in Fig. 4.

Fig. 7 is a side elevational view of the spatula head shown in Fig. 6 with portions broken away to show the recess adapted to receive the heating element tip.

Fig. 8 is an enlarged cross sectional view taken of the rear end of the handle portion showing the connection of the slide to the resistance.

Referring now particularly to Figs. 1 and 2, 15 represents a tapered handle portion having a central bore 15' extending from one end of the same to the other and adapted to accommodate wire conductors 16 and 17. The forward end of the handle portion 15 has an enlarged opening 18 to receive a heating element 19 enclosed within a casing 21 of stainless steel and tapered to its forward end to contain a tip 22 having an enlarged rear end portion 23 adapted to be received by the forward end of the casing 21 and retained against outward movement therefrom. The heating element 19 includes heating wires 24 extending throughout the length of the casing 21 and into the tip 22. The outer end of the tip 22 is threaded to receive a spatula head 25. The tip 22 is made of brass so that heat generated by the wires 24 extending into the tip is conducted to the spatula 25 so that the spatula will be conditioned for use with molten wax used for providing a temporary filling for teeth.

The handle portion 15 is preferably made of insulation and is reinforced at its forward end by a ring of insulating material 26. Throughout a portion of the length of the handle portion 15 there is a slot 27 through which there is extended a slide 28 having a contact 29 thereon to which is connected the wire 17. Extended between opposite ends of the slot 27 is a resistance 31 adapted to be traversed by the slide contact 29. The forward end of the resistance 31 is connected with a wire 32 which extends through the forward end of the handle portion for connection with the heating wires 24 within the heating element.

Referring now more particularly to the Figs. 3 to 7, the heating element is of different form as shown in Fig. 4 in that the tip is formed as an integral part of the casing forming the main body of the element and adapted to fit the recess 18 in the forward end of the handle portion 15. This heating element is indicated at 32 and comprises a main portion 33 and a tip portion 34 integral with the forward end of the main portion 33. Adjacent the tip there is provided a shoulder 35 adapted to be engaged by an internal shoulder 36 on a spatula head 37. This shoulder 36 is within a threaded recess 38 adapted to be screwed upon a threaded portion 39 of the main portion 33 of the heating element 32. Within the spatula head 37 and extending forwardly of the threaded recess 38 is a long narrow recess portion 41 adapted to receive the tip 34 of the heating element 32.

The resistance wire 31 in being connected between the end of the slot 27 has its end connected respectively to an inwardly extended projection 42 adjacent the opposite end of the slot 27.

It is to be understood that the spatula heads or tips may be interchangeable or permanently secured in position and that they may be made of any suitable shape and material; also that any suitable rheostat may be provided within the handle or connected in the electric circuit detached from the instrument.

While we have illustrated and described the preferred embodiments of our invention, it is to be understood that we do not limit ourselves to the precise constructions herein disclosed and the right is reserved to all changes and modifications coming within the scope of the invention as defined in the appended claim.

Having thus described our invention, what we claim as new, and desire to secure by United State Letters Patent, is:

In a dental spatula having a tubular handle formed at one end with an enlarged recess, a heating element casing having its rear end positioned in said recess and having its front end reduced, a hollow tip having an enlarged rear end snugly fitted within said reduced front end of said casing, screw threads formed on the extended front end of said hollow tip, a spatula having a screw threaded recessed rear end threadedly engaged with said screw threads of said hollow tip, and heating wires for connection with a source of electrical energy extended through said casing and into said hollow tip and electrically insulated from said casing and said hollow tip.

LEONARD FOX.
RAYMOND RESNICK.

REFERENCES CITED

The following references are of record in the file of this patent:

UNITED STATES PATENTS

| Number | Name | Date |
|---|---|---|
| 1,436,657 | Harvey | Nov. 28, 1922 |
| 2,074,629 | Ungar | Mar. 23, 1937 |
| 2,097,098 | Hiscox | Oct. 26, 1937 |
| 2,119,908 | Ellis | June 7, 1938 |
| 2,416,558 | Wilkinson | Feb. 25, 1947 |
| 2,430,989 | Miller | Nov. 18, 1947 |